Patented June 5, 1951

2,555,498

UNITED STATES PATENT OFFICE

2,555,498

N-ALKYL-N-NITROSO-N'-NITRO-GUANIDINES

Arthur Ferguson McKay, Kingston, Ontario, Canada, assignor to The Honorary Advisory Council for Scientific and Industrial Research, Ottawa, Ontario, Canada, a corporation of Canada No Drawing. Application October 22, 1948, Serial No. 56,054

5 Claims. (Cl. 260—564)

This application is a continuation-in-part of abandoned application Serial No. 782,453, filed October 27, 1947.

This invention relates to a new compound, namely, N-substituted-N-nitroso-N'-nitroguanidine and its preparation.

The compound is produced primarily for use as an intermediate in the production of N-substituted-N'-nitroguanidines as described in this application and in abandoned United States patent application Serial No. 782,452, filed on the 27th day of October, 1947. N-substituted-N'-nitroguanidines are used to prepare, for example, synthetic antibiotics, anti-histamine substances, insecticides or other useful biologically active materials.

The invention comprises the conversion of an N-substituted-N'-nitroguanidine to an N-substituted-N-nitroso-N'-nitroguanidine, the N-substituents being organic substituted or unsubstituted lower alkyl, or aralkyl groups. The N-substituted-N-nitroso-N'-nitroguanidine is prepared by first dissolving N-substituted-N'-nitroguanidine in concentrated acid and diluting the solution with water. The acid used is hydrochloric, sulphuric, or nitric, but nitric acid solutions are preferred. The solution is then cooled and to it is added a solution of an alkali metal nitrite. The alkali metal nitrite is sodium, potassium, rubidium or caesium.

Preparation of the compound is shown by the equation:

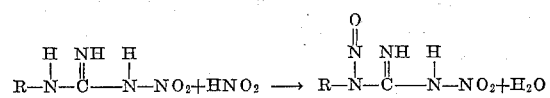

where R represents either a lower alkyl, or aralkyl group.

In accordance with the invention the substituent group R in the above equation is, for example, a hydrocarbon methyl, ethyl, butyl, propyl, phenyl-ethyl, or benzyl radical.

The invention is carried out by first dissolving the N-substituted-N'-nitroguanidine in a strong and concentrated acid. The solution formed is diluted with water and then cooled. Alkali metal nitrite dissolved in water is then added over a period of about five minutes. Rate of addition of the nitrite is regulated and, if required, cooling of the reaction vessel, in order to maintain the temperature of the reaction at the desired point. Throughout the addition of the nitrite and for a further twenty minutes or so, stirring of the mixture is continued. Upon completion of the reaction the yellow crystalline product formed is filtered off and washed with cold water. The crude product melts at 112°–113° C. with decomposition. The yield is about 90 percent of theoretical. The product may be purified by crystallizing from methanol.

The following examples are given by way of illustration:

EXAMPLE I

*N-methyl-N-nitroso-N'-nitroguanidine*

Ten parts of N-methyl-N'-nitroguanidine were dissolved in 30 parts of 70% HNO₃ (sp. gr. 1.42) and the solution was diluted with 100 parts of water. The resulting solution was cooled to 5° C. and 12.4 parts of sodium nitrite dissolved in 20 parts of water was added over a period of five minutes. The rate of addition was regulated to maintain the temperature at 5.8° C. During the addition period and for a further period of twenty minutes, the reaction mixture was mechanically stirred. The yellow crystalline product melted at 112–113° C. with decomposition. The yield was 90% of the theoretical. A sample was purified by crystallization from methanol (4.8 cc. per gram). The purified product melted at 118° C. with decomposition.

EXAMPLE II

*N-methyl-N-nitroso-N'-nitroguanidine*

A solution of 118 g. (1 mole) of N-methyl-N'-nitroguanidine (M. P. 159–161° C.) in 350 c. c. of nitric acid solution (sp. gr. 1.42) is placed in a 3 l. beaker equipped with an efficient stirrer. This solution is diluted with 1100 c. c. of water and placed in a cold bath (ice-brine mixture). The temperature is maintained at 10–14° C. while a solution of 138 g. (2 mole) of sodium nitrite in 300 c. c. of water is added. The addition of the sodium nitrite solution requires about ten minutes. The stirring is continued for a further fifteen minutes after which the yellow N-methyl-N-nitroso-N'-nitroguanidine is recovered by filtration and washed well with water. The crude product melts at 112–113° C. with decomposition. The yield is 125 g. or 85% of the theoretical. The crude product is dissolved in refluxing absolute methanol, 3.3 c. c. per gram, which on cooling to room temperature deposits large yellow crystals of N-methyl-N-nitroso-N'-nitroguanidine. A second crop of pure N-methyl-N-nitroso-N'-nitroguanidine is obtained by concentrating the filtrate to approximately ⅓ its original volume. The total yield of purified compound is 117.5 g. or 80% of the theoretical. The purified N-methyl-N-nitroso-N'-nitroguanidine melts at 118° with decomposition.

EXAMPLE III

*N-ethyl-N-nitroso-N'-nitroguanidine*

Forty-seven and three-tenths parts of N-ethyl-N'-nitroguanidine were dissolved in 192 parts by weight of nitric acid (sp. gr. 1.42) and the solution was diluted with 450 parts of water. The temperature was lowered to 10–12° C. and maintained at this temperature during the course of the reaction. To the mechanically stirred solution 55.5 parts of sodium nitrite in 90 parts of water was added over a period of ten to fifteen minutes. The stirring was then continued for a further period of fifteen minutes after which the yellow crystalline N-ethyl-N-nitroso-N'-nitroguanidine was filtered off and washed well with water. The crude product (43.7 parts or 76% of the theoretical) melted at 112° C. with decomposition. One crystallization from absolute methanol raised the melting point to 114.5° C. with decomposition. The purified yield was 72% of the theoretical.

EXAMPLE IV

N-butyl-N-nitroso-N'-nitroguanidine

N-butyl-N'-nitroguanidine (2 g.) was dissolved in 10 c. c. of 70% $HNO_3$ (sp. gr. 1.42) and 15 c. c. of water was added. This solution was cooled to 8–12° C. and 2.48 g. of $NaNO_2$ in 15 c. c. of water were added slowly with stirring. After addition of the sodium nitrite solution the reaction mixture was left standing in the ice-water bath for ten minutes. The yellow crystals were then filtered off and washed with water. The yield was 70% of the theoretical. The crude product melted at 77–79° C. with decomposition but the melting point was raised to 113° C. after one recrystallization from 95% ethanol.

EXAMPLE V

N-benzyl-N-nitroso-N'-nitroguanidine

Ten parts of N-benzyl-N'-nitroguanidine were dissolved in 165 parts of nitric acid (sp. gr. 1.42) and the solution diluted with 100 parts of water. This solution was cooled to 14° C. and 12.4 parts of sodium nitrite in 20 parts of water was added over a period of eight minutes. The stirring was continued for an additional twenty minutes. After approximately fifteen minutes 100 parts of water was added to the solution. At the end of the reaction period the yellow N-benzyl-N-nitroso-N'-nitroguanidine (M. P. 114.5–115° C. with decomposition) was filtered off and washed well with water. The crude yield was 6.9 parts by weight or 69% of the theoretical. One recrystallization from methanol raised the melting point to 117.5–118° C. with decomposition.

EXAMPLE VI

N-(β-phenylethyl)-N-nitroso-N'-nitroguanidine

To prepare N-(β-phenylethyl)-N'-nitroguanidine seven and two-tenths grams of β-phenylethylamine were dissolved in 75 c. c. of ether and 15 c. c. of water and 8 grams of N-methyl-N-nitroso-N'-nitroguanidine was added. The reaction mixture was left at room temperature for thirty minutes. Then the crystals formed were filtered off and washed with ether. The yield was 5.20 grams or 93% of the theoretical and the M. P. of the crystals was 162–163° C.

Two grams of N-(β-phenylethyl)-N'-nitroguanidine were dissolved in 11 cc. of 70% nitric acid (sp. gr. 1.42) and this acid solution was diluted with 10 cc. of water. The solution which was slightly hazy, was cooled to 12° C. and 2.48 g. of $NaNO_2$ in 10 cc. of water were added slowly with stirring. After the addition of the $NaNO_2$ which required approximately five minutes, the reaction mixture was allowed to stand in the ice-water bath for five minutes. The yellow crystals were filtered off and washed with water. The yield was 72% of the theoretical. These crystals melted at 116–117° C. with decomposition but after one recrystallization from 95% ethanol, they melted sharply at 133° C. with decomposition.

The following examples give by way of illustration the use of N-substituted-N-nitroso-N'-nitroguanidine.

EXAMPLE VII

N-phenyl-N'-nitroguanidine

Two parts of N-methyl-N-nitroso-N'-nitroguanidine covered with 5 parts of water were treated with 1.4 parts of aniline suspended in 5 parts of water. A slow evolution of gas occurred at room temperature. After standing at room temperature for about sixteen hours with occasional stirring, a solid mass contaminated with aniline formed. The solid was filtered off and washed with 20 parts of water and 6 parts of cold 95% ethanol. The remaining white solid melted at 149–152° C. The yield was 1.6 parts by weight or 66 per cent of the theoretical. This material after one recrystallization from 95% ethanol melted at 152–153°.

What I claim as my invention is:

1. As a new compound, N-alkyl-N-nitroso-N'-nitroguanidine having the structural formula

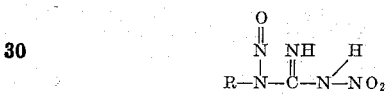

where R is a lower alkyl radical.

2. As a new compound, N-methyl-N-nitroso-N'-nitroguanidine having the structural formua

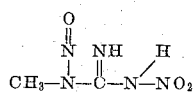

3. As a new compound, N-ethyl-N-nitroso-N'-nitroguanidine having the structural formula

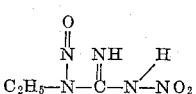

4. As a new compound, N-butyl-N-nitroso-N'-nitroguanidine having the structural formula

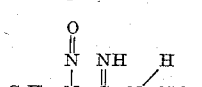

5. A method for making N-butyl-N-nitroso-N'-nitroguanidine which comprises dissolving N-butyl-N'-nitroguanidine in strong nitric acid and adding water, cooling the solution and then adding, while stirring, sodium nitrite in aqueous solution with further cooling to cause crystals of N-butyl-N-nitroso-N'-nitroguanidine to form and recovering said crystals.

ARTHUR FERGUSON McKAY.

REFERENCES CITED

The following references are of record in the file of this patent:

UNITED STATES PATENTS

| Number | Name | Date |
| --- | --- | --- |
| 2,432,975 | Teicher | Dec. 16, 1947 |

OTHER REFERENCES

Davis et al.: "Proc. Am. Acad. Arts & Sci.," vol. 61 (1926), pages 441 to 450.

Davis et al.: "J. Am. Chem. Soc.," vol. 49 (1927), pages 2303 to 2304.